Aug. 29, 1967     M. E. CESSNA     3,339,003
SEALING OF THREADED FASTENERS
Filed June 1, 1964
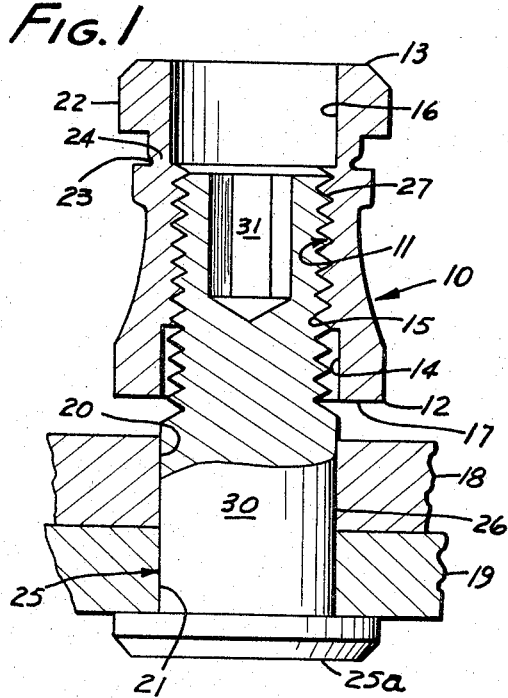
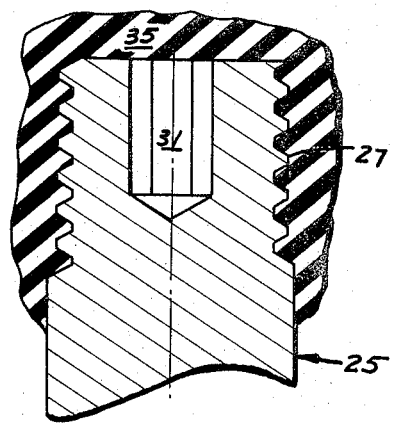
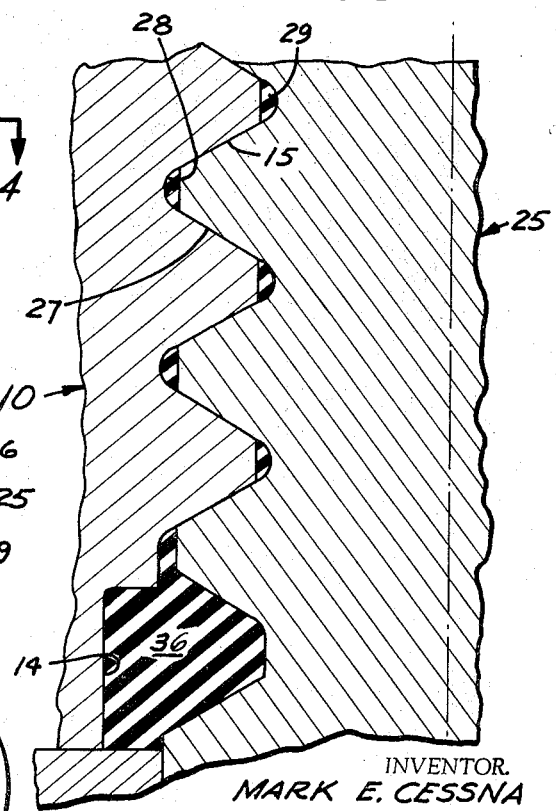
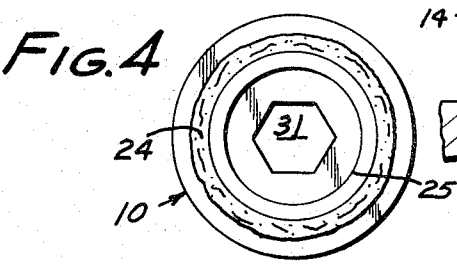
INVENTOR.
MARK E. CESSNA
BY
ATTORNEYS.

United States Patent Office 3,339,003
Patented Aug. 29, 1967

3,339,003
SEALING OF THREADED FASTENERS
Mark E. Cessna, Redondo Beach, Calif., assignor to Hi-Shear Corporation, Torrance, Calif., a corporation of California
Filed June 1, 1964, Ser. No. 371,671
4 Claims. (Cl. 264—262)

This invention relates to a means and method for providing a fluid seal between the threads of a collar and a threaded pin and also between the collar and a body against which the collar bears.

In making threaded joints, it is a common practice to utilize a threaded pin which may comprise the shank of a stud or of a bolt that projects from one or a plurality of bodies, to which a threaded collar such as a nut is tightened down against the body so as to compress the bodies in a stack, and hold the joint assembled. Such a joint is inherently leaky, and numerous efforts have been made to seal it.

The most commonly-encountered seals for this purpose are glands, compressible washers and the like, which are placed around the shank between the collar and the body. However, these conventional seals have the almost uniform disadvantage that the constant force of the collar against it causes the material to creep, and finally a leak develops unless routine attention is given to tightening down the collar against it. It also follows that to have a resilient element in the fastener system results in an inherently unreliable joint as far as its tightness and fatigue characteristics are concerned.

It is an object of this invention to provide a method and means for sealing a threaded collar to a threaded pin which does not utilize pressure against a flexible element for sealing, and which exerts its sealing effect not only between the collar and the body against which the collar bears, but also in the interstices between the engaging threads of the collar and the pin.

This invention has the additional advantage of being compatible with that class of inherently torque-limiting fasteners exemplified by the collar shown in George S. Wing Patent No. 2,940,495, issued June 14, 1960, and in a torque-limiting threaded pin exemplified by that shown in George S. Wing, patent application Ser. No. 129,699, filed Aug. 7, 1961, entitled Fastener, now Patent No. 3,138,987. In this class of fastener, either the pin or the collar is provided with a region of reduced cross-section. On one side of this region there is disposed a permanent part of the fastener, such as the threads of the pin or the collar. On the other side of this region there is a driving section which usually includes features such as flats for engagement by a wrench. When a given torque level is exerted on the driving section, the fastener shears off at the reduced region terminating the driving of the fastener. Fluid-sealing means in such a fastener has heretofore been unattainable, for the reason that common sealants have disturbed the ratio between the torque exerted on the collar, and the axial preload in the shank. For example, common seals often creep axially after torque is applied, thereby rendering uncertain whether the applied torque has been transmitted into axial preload in the pin, and whether the axial preload remains on the fastener over an extended period of time. The instant invention overcomes such uncertainties. Accordingly, it is an additional but optional objective of this invention to provide a method of means for sealing between a threaded pin and collar in systems set to a given torque level.

A fastener assembly according to this invention includes a threaded pin, and a collar with an internally-threaded passage. The threads on the collar and pin are adapted to be mutually engaged so that the collar can be tightened down onto the pin against a body to which the pin is engaged, and there is a spiral reservoir formed between either the major or the minor diameters of the threads. According to a preferred practice of the invention, one of the threads is shaped so that a spiral reservoir is formed, contiguous to its projecting peak, i.e., contiguous to the external major crest diameter of the pin, or to the internal minor crest diameter of the nut. For example, it is preferred practice to reduce the major diameter of the pin thread. The reduction of diameter is such as to cause a radial clearance between the respective diameters of the pin and collar threads on the order of 0.005″–0.006″. An enlargement of the same order of magnitude may, but need not, be provided on both major and minor diameters, should it be desired to provide two spiral reservoirs instead of one.

According to another feature of this invention, the collar is provided with a counterbore on the end adapted to abut the workpiece, said counterbore opening onto the workpiece and providing still another reservoir of sealant.

According to a preferred but optional feature of this invention, either or both of the pin and collar are driven by wrench-engaging sections which are separated from the aforesaid threads by a region of reduced cross-section adapted to shear at a predetermined torque level.

According to still another preferred but optional feature of this invention, the sealant cures to a form which is solid, resilient, essentially incompressible, and adherent to the surfaces of the collar and pin.

The above and other features of this invention will be fully understood from the following detailed description and the accompanying drawings in which:

FIG. 1 is a side view, partly in cutaway cross-section, showing the presently preferred embodiment of the invention before final assembly, but without the sealant;

FIG. 2 is a cross-section showing the shank member of FIG. 1 with the sealant on it;

FIG. 3 is a side view of the assembly of FIG. 1, installed;

FIG. 4 is a top view of FIG. 3 taken at line 4—4 thereof; and

FIG. 5 is an enlarged, fragmentary cross-section taken at line 5—5 of FIG. 3.

FIG. 1 illustrates a collar 10 substantially in accordance with said George S. Wing Patent No. 2,940,495. This collar has a passage 11 extending through its entire length, and terminating at a first end 12 and a second end 13. At the first end, there is a counterbore 14. An internal thread 15 of lesser major diameter than the counterbore extends into the passage. Above the threads and opening onto the second end is a second bore 16 whose diameter is at least as great as the major diameter of a thread which may pass through it, so as not to engage that thread.

The external surface of the collar adjacent to the first end is generally circular, and has a flat annular surface 17 at that end, adapted directly to abut against body 18. The purpose of the illustrated assembly is to make a tight joint between bodies 18 and 19. Should a close sealing fit be desired between body 18 and surface 17, surface 17 can be finished quite smoothly and body 18 can be spot-finished adjacent to hole 20. Body 19 has a hole 21 aligned with hole 20.

Also on the exterior of the collar, but at end 13, there is a wrench-engaging section 22, preferably with a hexagonal array of flats for engagement by a standard wrench. Between the two ends, there is a groove 23 providing a region 24 of reduced cross-sectional area where the body will shear when sufficient torque is exerted across the two ends. Bore 16 extends past and beyond groove 23 so that there is not a threaded engagement inside that part of the body which is axially aligned with groove 23. Therefore, when the collar shears at region 24, the wrench-engaging section will fall free.

A pin 25, illustrated as a bolt but which might be a stud or any other threaded means including a shank, has a head 25a and a shank 26. The shank includes a modified thread 27. This thread 27 is the standard American National type, as is thread 15, which mates with it. However, the major diameter of the standard thread will be adjusted, such as by grinding or by initial forming, so that there is a clearance between the major diameters of the collar and pin of at least 0.005″ to 0.006″. This arrangement forms a spiral reservoir 28 when the collar and pin are engaged. Should it be desired, and often it will be, a similar modification may be made to the minor diameter of the collar thread, so as to provide a second reservoir 29.

Thread 27 is adjacent to a cylindrical section 30 that is adapted to make a close fit with the walls of holes 20 and 21. The diameter of counterbore 14 is greater than the diameter of section 30, so that there will be a radial clearance between them. The major diameter of thread 15 is less than that of section 30, so that the thread can pass through holes 20 and 21. Wrench-engaging means 31 is disposed on the end of the fastener farthest removed from region 30. This may conveniently comprise a hexagonal or other non-circular recess.

As a variant to the fastener system shown, wherein the region of reduced cross section is on the collar, it could, instead, be provided between the wrench-engaging means and the thread on the shank. A way of accomplishing this is shown in the aforesaid copending patent application, and comprises an axial stub with external driving faces, with a groove between it and the threads. The function of the reduced cross-section is the same in both embodiments: to shear at a predetermined torque level.

The assembly will be set by counter-rotation of the pin and the collar, utilizing tools such as those shown in Wing Patents Nos. 2,882,773 and 3,041,902.

Before the fastener is loosely assembled as in FIG. 1, the threaded portion of the shank is dipped into a liquid sealant, so that a quantity of sealant 35 adheres thereto as a blob, as shown in FIG. 2. Then, when the collar is turned onto the shank, the sealant is chased down the thread, filling the spiral reservoir, and into counterbore 14. The viscosity of the sealant is selected so that enough sealant adheres to the shank substantially to fill the spiral reservoirs and also reservoir 36 (FIG. 5). Then as the nut is driven down, reservoir 36 fills up, and the spiral reservoir 28 and/or 29 is substantially filled, at least adjacent to reservoir 36.

The bearing of the collar against body 20 is metal-to-metal, and no attempt is made to cause a metal-to-metal seal. Instead, the sealing at this point is made at the boundaries of reservoir 36. The spiral reservoirs provide a bleed for excess material which may be trapped in the counterbore.

A sealant suitable for this purpose is EC 801, sold by Production Research Corporation, Los Angeles, Calif. This is a catalyst-activated elastomer which, after a time, sets to a resilient, essentially incompressible state. This sealant, like others which are suitable, is adherent to metal surfaces. It therefore provides an adherent, resilient seal within a system in which the force reactions are derived from direct metal-to-metal contact at surface 17, and in the threads.

The sealant will be made up in small batches so that least waste will occur. Customarily a small cupful will be mixed, and then the shank ends will be dipped in it, until the setting process goes too far, so that the material is so viscous that it interferes with the fastener, or does not adhere to the shank. Then a new batch is mixed.

The desired consistency is a matter of judgment, so as to get a blob of sufficient size. Because the excess sealant material, while liquid, can readily be expelled from between contiguous surfaces such as threads, and then can escape through the spiral reservoir, these materials do not interfere with the torque levels and axial pre-load levels in the fastener system.

After installation, the sealant cures and makes its seal. It is important to note that the sealant exactly fills the void regions within a metal-to-metal contact fastener system, and thereby enables a tight, fatigue-resistant joint to be made, because there is no resilient material within the force-reaction system—it is merely adherent to faces past which fluid would otherwise leak.

The utility of this invention is not limited to systems with inherent torque-limiting features. However, it does expand the utility of these fasteners, because it makes its seal without interfering with torque or pre-load levels. This invention is fully useful with standard collar-pin installations which are furnished with a counterbore such as counterbore 14, and a suitable spiral reservoir.

This invention is not to be limited by the embodiments shown in the drawings and described in the description which are given by way of example and not of limitation, but only in accordance with the scope of the appended claims.

I claim:

1. A method for tightening together to a predetermined torque two threadedly-engaged bodies which have a spacing forming a spiral reservoir along and between their threads, and a counterbore in one of said bodies in fluid contiguity with the said spiral reservoir, thereby to form another reservoir within the counterbore and between the bodies in fluid communication with the said spiral reservoir, and to seal the joint formed by the said bodies, said method comprising applying a sealant in liquid state to the thread of one of said bodies in quantity sufficient to fill the second-named reservoir, and to fill the spiral reservoir at least adjacent to the other reservoir, tightening down the bodies on one another to the said torque while the sealant remains in liquid state, and permitting the sealant in said reservoirs to cure to a solid, resilient, essentially incompressible member adherent to the opposed surfaces of both bodies.

2. A method for tightening together to a predetermined torque two threadedly-engageable bodies which have a spacing forming a spiral reservoir along and between their threads, and a counterbore in one of said bodies in fluid contiguity with the said reservoir, thereby to form another reservoir within the counterbore and between the bodies in fluid communication with the spiral reservoir, and to seal the joint formed by said bodies, said method comprising applying an elastomer in liquid state to the thread of one of said bodies in quantity sufficient to fill the second-named reservoir, and to fill the spiral reservoir at least adjacent to the other reservoir, tightening down the bodies on one another to the said torque while the elastomer remains in the liquid state, and permitting the elastomer in said reservoirs to cure to a solid, resilient, essentially incompressible state, thereby to form a body adherent to the surfaces which surround it, thereby to seal against fluid leakage between said surfaces.

3. A method for tightening together to a predetermined torque two threadedly-engageable bodies, one of which is inherently limited in the torque load applicable thereto, said bodies having a spacing forming a spiral reservoir along and between their threads, and a counterbore in one of said bodies in fluid contiguity with the said spiral reservoir thereby to form a reservoir within the counterbore and between the bodies in fluid communication with the said spiral reservoir and to seal the joint formed, said method comprising applying a sealant in liquid state to the thread of one of said bodies in quantity sufficient to fill the second-named reservoir and to fill the spiral reservoir at least adjacent to the other reservoir, tightening down the bodies on one another to the inherent torque level while the sealant remains in the liquid state, and permitting the sealant to cure to a solid, resilient, essentially incompressible member adherent to the opposed surfaces of both bodies.

4. A method for tightening together to a predetermined torque two threadedly-engageable bodies, one of which is inherently limited in the torque load applicable thereto, said bodies having a spacing forming a spiral reservoir along and between their threads, and a counterbore in one of said bodies in fluid contiguity with the said spiral reservoir, thereby to form a reservoir within the counterbore and between the bodies in fluid communication with the spiral reservoir and to seal the joint formed, said method comprising applying an elastomer in liquid state to the thread of one of said bodies in quantity sufficient to fill the second-named reservoir and to fill the spiral reservoir at least adjacent to the other reservoir, tightening down the bodies on one another while the elastomer remains in the liquid state, and permitting the elastomer to cure to a solid, resilient, essentially incompressible state, thereby to form a body adherent to the surfaces which surround it to seal against fluid leakage between said surfaces.

References Cited

UNITED STATES PATENTS

| | | | |
|---|---|---|---|
| 2,001,290 | 5/1935 | Thomson | 151—14.5 |
| 2,153,494 | 4/1939 | Arutunoff | 151—14.5 |
| 2,686,342 | 8/1954 | D'Eustachio | 85—1 |
| 2,697,873 | 12/1954 | Cooke | 189—36 |
| 2,741,288 | 4/1956 | Johnson | 151—7 |
| 2,940,495 | 6/1960 | Wing | 85—61 |
| 2,942,640 | 6/1960 | Lundeberg | 151—41.5 |
| 3,174,385 | 3/1965 | Hallowell | 85—61 |

FOREIGN PATENTS

| | | |
|---|---|---|
| 1,296,555 | 5/1962 | France. |
| 690,770 | 4/1953 | Great Britain. |

CARL W. TOMLIN, *Primary Examiner.*

M. PARSONS, *Assistant Examiner.*